Figure 1:
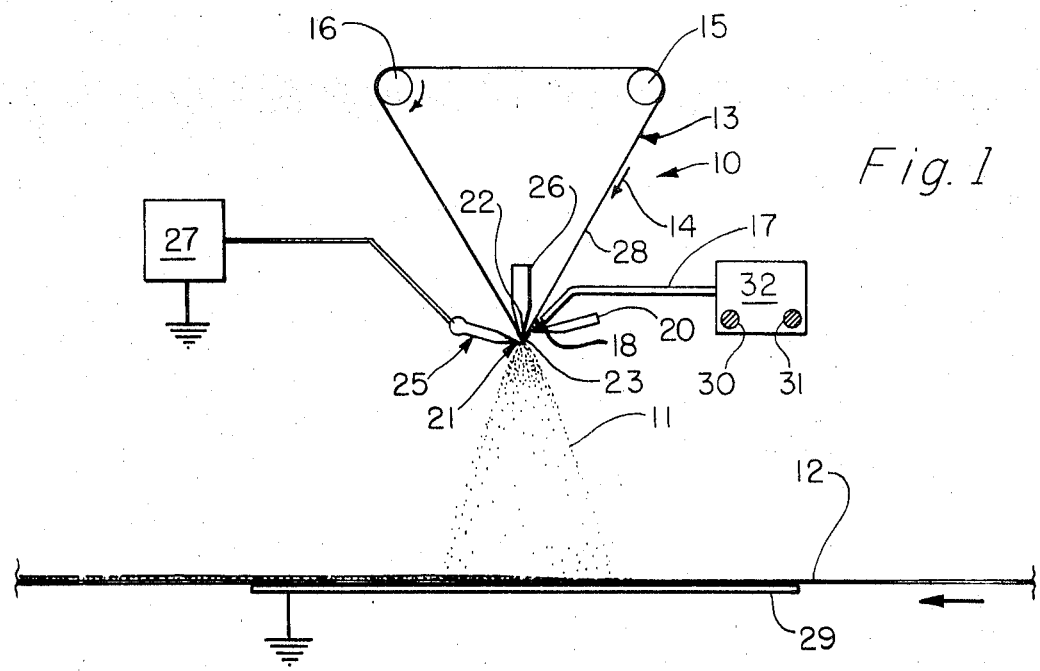

United States Patent [19]
Probst

[11] 3,776,187
[45] Dec. 4, 1973

[54] ELECTROSTATIC DEPOSITION APPARATUS

[75] Inventor: Richard O. Probst, Indianapolis, Ind.

[73] Assignee: Ransburg Electro-Coating Corp., Indianapolis, Ind.

[22] Filed: May 3, 1972

[21] Appl. No.: 249,867

Related U.S. Application Data

[62] Division of Ser. No. 061,308, Aug. 5, 1970, Pat. No. 3,676,194.

[52] U.S. Cl. ............................... 118/626, 317/3
[51] Int. Cl. ............................................. B05b 5/02
[58] Field of Search ..................... 118/626, 637; 117/17, 17.5; 346/1 NQ; 317/3; 239/3, 15

[56] References Cited
UNITED STATES PATENTS

| | | | |
|---|---|---|---|
| 2,651,287 | 9/1953 | Turner | 118/637 UX |
| 2,695,002 | 11/1954 | Miller | 239/15 X |
| 2,723,646 | 11/1955 | Ransburg | 118/626 |
| 2,893,893 | 7/1959 | Crouse | 118/626 X |
| 3,010,428 | 11/1961 | Sedlacsik | 118/626 X |
| 3,221,992 | 12/1965 | Sedlacsik, Jr. et al. | 239/15 |
| 3,512,502 | 5/1970 | Drum | 118/626 X |

Primary Examiner—Morris Kaplan
Attorney—Merrill N. Johnson et al.

[57] ABSTRACT

Apparatus for providing the charged particles includes an electrically insulative belt having a surface upon which the organoplastic material is placed and transported to an electrical charging and atomizing zone. Positioned within the charging and atomizing zone is means having an extended or elongated edge at high electrical potential. The extended edge is so positioned as to be substantially transverse of and in close proximity with the surface of the insulative means transporting the organoplastic material. A high intensity electric field extends from the extended edge to, or in some instances, through the substrate if the substrate is porous and fabricated from an insulative rather than a conductive material. The position of the extended edge at high electrical potential relative to the organoplastic material causes the organoplastic material to be formed into charged particles that are projected toward and deposited upon the substrate.

3 Claims, 2 Drawing Figures

ELECTROSTATIC DEPOSITION APPARATUS

This is a continuation, division, of application Ser. No. 061,308, filed Aug. 5, 1970 and now U.S. Pat. No. 3,676,194.

The present invention relates to electrostatic spraying of an organoplastic material and, more particularly, to an improved electrostatic apparatus in which a polymeric organoplastic foam material is atomized and electrostatically deposited upon a substrate.

The use of a thin sheet or layer of a polymeric organoplastic foam material as backing for a woven or non-woven fiber webs such as carpeting has increased during the last several years due to, among other things, the production costs associated with non-foamed materials. A number of polymeric organoplastic foam materials for use as carpet backing have been proposed. Such polymeric organoplastic foam materials include flexible foams such as polyolefin, polyethylene, polyurethane and the like. The above flexible polymeric organoplastic foam materials all have some advantages when used as backing for carpeting. For example, flexible polyethylene foam does not impart an objectionable odor to the carpet and, usually, an adhesive is not required to adhere the flexible polyethylene foam to the carpet. Nevertheless, flexible polyurethane foam is becoming increasingly more popular as a backing material for carpeting because of its relatively inert chemical nature, elasticity, drapability dimensional stability, thermal insulation, wear resistance, shock absorption and low cost.

An automated apparatus for dispensing a flexible polyurethane foam material uses a reciprocating mixing head to deposit foamable polyurethane liquid in a moving mold cavity having the desired configuration. Most mixing heads use a chamber which receives the several components which comprise the polyurethane. Located within the chamber is an agitator or stirrer which is immersed in the components and which revolves for the purpose of mixing the components. The mixed components of the polyurethane exit the mixing head as a liquid stream which is deposited in the mold before foaming thereof takes place. It is necessary to revolve the agitator at high speed in order to effectively mix the components into a homogeneous mixture within the time allowed for mixing. The mixture while in the mold reacts to generate a thick slab of foam.

Depositing a polyurethane plastic foam using the above automated apparatus including a mixing head using an agitator or stirrer is satisfactory for many applications; however, certain processing restrictions are imposed. For example, after the polyurethane foams in the mold cavity and is suitably cured and aged, it is removed from the mold cavity as thick slabs and sliced into relatively thin sheets on the order of one-eighth to one-fourth inch for subsequent bonding to the carpeting as backing material. The polyurethane tends, however, to foam irregularly thereby providing a thick slab having a rather irregular exterior surface. As a result of this irregular surface contour, up to about 15 per cent by volume of the foamed polyurethane may be virtually useless as backing material for carpeting.

The usable slices of polyurethane foam are then bonded to the carpeting by an adhesive which is compatible with both the fibers of the carpeting and the polyurethane foam.

It should be seen that a substantial cost is associated with the steps of cutting, fitting, and bonding the polyurethane foam to the fibers of the carpeting.

Electrostatic spraying of coating materials onto a substrate has several advantages. These advantages include providing an adherent, relatively thin, substantially uniform layer of coating material over the surface of the substrate without the use of cements, excess material removers, materials levelers and the like.

It is, therefore, an object of the present invention to provide an electrostatic apparatus for dispensing an organoplastic material that is adapted to provide a relatively thin, but substantially uniformly thick, adherent layer of the organoplastic material upon a substrate. Another object of the present invention is to provide an apparatus for electrostatically atomizing a foamable polymeric organoplastic material; the apparatus including an extended edge at high potential in contact with at least some of the foamable polymeric organoplastic to be charged and atomized.

Generally speaking, the present invention relates to an electrostatic apparatus for electrostatically depositing an organoplastic material such as a foamable polymeric organoplastic material upon a substrate such as a woven or non-woven bundle of fibers. The apparatus includes an extended edge at high potential which provides a high intensity electric field so as to electrostatically atomize the organoplastic material carried by an insulative belt.

It is to be understood that the present invention is applicable to organoplastic materials other than flexible polyurethane foam. Examples of other organoplastic materials are polymeric organoplastic foams including but not limited to foamable thermoplastic polymers, foamable urea-formaldehyde, foamable phenolics, foamable epoxy resins, foamable silicones and the like. The foams may be either flexible or rigid. Of course, flexible foam materials are preferred over rigid foam materials if the foam material is to be used as backing for a carpet. The concepts of the present invention are also applicable to the deposition of organoplastic materials onto a myriad of electrically insulative and conductive substrate materials including but not limited to fibrous webs, wood, plastic, ceramic, metal and the like.

The purpose of illustration and not for the purpose of limitation, the operation of the apparatus and method embodying the concepts of the present invention shall be described in conjunction with a flexible polyurethane foam and woven fiber bundle.

Figure 2:
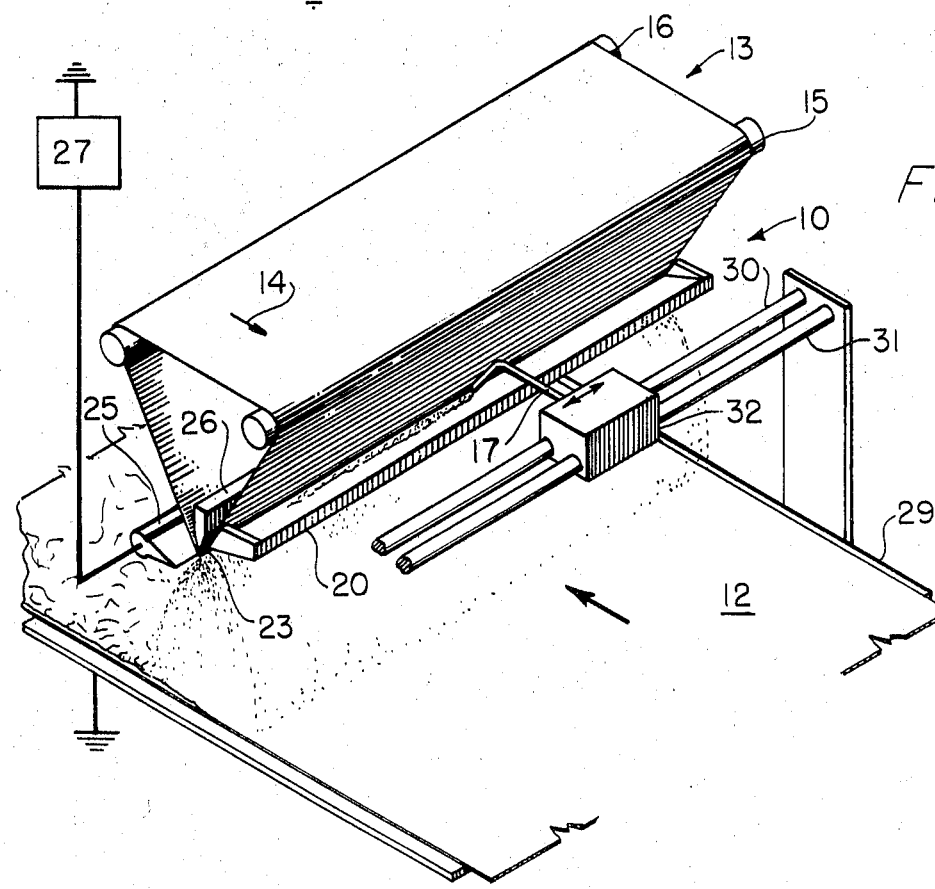

In the drawing:

FIG. 1 is a diagrammatic illustration embodying the concepts of the present invention; and FIG. 2 is a perspective view of the apparatus illustrated in FIG. 1.

Referring now to the several FIGURES of the drawing and in particular to FIG. 1, an apparatus 10 for atomizing and applying electrically charged particles 11 of a foamable polyurethane liquid to a displaceable woven fiber bundle 12 is shown.

The apparatus 10 includes a displaceable, endless belt 13 fabricated from a resilient, electrically insulative material such as polytetrafluorethylene. The belt 13 is displaced in the direction of arrow 14 by any suitable means such as by cylinders 15 and 16. The cylinders 15 and 16 may be driven in the clockwise direction by any suitable drive means (not shown) such as a motor connected to each of the cylinders through any suitable speed reduction gear system (not shown).

A reaction or mixing head 32 includes a mixing chamber (not shown) employing a suitable revolving agitator (not shown) immersed in the components which will constitute the polyurethane. The component may enter the mixing chamber of the mixing head 32 through individual slots provided therein. For example, the polyester, the polyisocyanate, and suitable activator solution may be separately pumped to the mixing head 32 or a mixture of polyester and polyisocyanate may be pumped to the mixing head where it is mixed with the activator solution. The foamable liquid emerges from the mixing head 32 through aperture 18 of conduit 17. The aperture 18 of conduit 17 is adjacent surface 28 of belt 13. The mixing head 32 and the conduit 17 are reciprocated across the width of the belt 13 by any suitable means to insure a relatively uniform deposit of the mixture of the foamable polyurethane liquid on surface 28 of belt 13 in the nip between the belt and blade 20. Parallel spaced guides 30 and 31 serve to predeterminately locate mixing head 32 with respect to the endless belt 13 and blade 20 as the mixing head and the conduit reciprocate across the belt. It is preferred that the components of the polyurethane be mixed immediately prior to contact with the surface 28 of the endless belt 13 in order to minimize premature foaming of the polyurethane liquid. Foaming of the polyurethane liquid may be controlled by the addition thereto of suitable additives. Endless belt 13 transports the newly mixed, but as yet unfoamed polyurethane liquid in the direction of arrow 14.

Adjacent to but spaced from the endless belt 13 is blade 20. Blade 20 serves to limit the thickness of the polyurethane liquid as it passes thereunder so that polyurethane liquid is distributed substantially uniformly over the surface of the endless belt 13 as the belt moves in the direction of arrow 14. It is seen that blade 20 assists in providing determined amounts of polyurethane liquid to charging and atomizing zone 21 of the apparatus 10.

The charging and atomizing zone 21 provides electrostatic charging and atomization of the polyurethane liquid provided by the mixing head 32. Included within the charging and atomizing zone 21 is wedge-shaped means 26 having elongated tip 22 which extends thwartwise the endless belt 13. The elongated tip 22 of the wedge-shaped means 26 is adapted to form the endless belt 13 into a relatively attenuated edge as shown at 23. For best results, the attenuated edge 23 should be appropriately spaced from and substantially perpendicular to the fibrous web 12 as shown in the several Figures of the drawing.

Disposed adjacent the surface of the endless belt 13 and in the charging and atomizing zone 21 is extended edge 25. Preferably, the extended edge 25 is relatively sharp and fabricated from any suitable wear resistant, electrically conductive material such as cold-rolled steel and the like. It is preferred that the extended edge 25 be so situated with respect to the polyurethane liquid that it engages with such liquid at about attenuated edge 23 of endless belt 13.

The extended edge 25 is connected to one terminal of high voltage power supply 27 which is capable of providing up to 130,000 volts direct current to edge 25. The other terminal of power supply 27 is grounded. The extended edge 25 traverses the width of the endless belt 13 so as to provide an electrostatic field of high intensity between itself and the web material. The high density field causes charging and atomization of polyurethane liquid from attenuated edge 23 of endless belt 13.

It was found that substituting the extended edge 25 for wedge-shaped means 26 and connecting the edge to a high potential did not provide an electrostatic field of sufficient intensity at the voltages herein suggested to achieve the desired electrostatic deposition.

The extended edge 25 may be spaced 6 to 10 inches or more from the surface of the fibrous web material 12 to be coated by polyurethane foam. The extended edge 25 and the attenuated edge 23 are each spaced about the same distance from the web material 12. It is preferred that a voltage gradient of about 3,000 to 10,000 volts per inch, and preferably in the neighborhood of 8,000 to 9,000 volts per inch, be provided between the extended edge 25 and the vicinity of fibrous web 12. It is to be understood that the voltage gradient necessary to provide an electrostatic field of an intensity necessary to achieve the desired results may vary depending on, among other things, the organoplastic material to be charged and atomized.

To effect atomization of the polyurethane liquid and electrostatic deposition thereof on the fibrous web 12 as it passes beneath apparatus 10, an electrostatic field of high intensity strength should be maintained between the extended edge 25 and the web 12. It is recognized that where the substrate to be coated is of an electrically non-conductive material such as wood, it should be rendered electrically conductive by a suitable means such as by treatment with a conductive solution of the type described in U.S. Letters Pat. No. 3,236,679 and earthed or grounded; or in the case of a non-conductive but relatively porous web 12, it may be earthed or grounded by placing thereunder a grounded or earthed electrically conductive support such as support plate 29. The charged particles of the polyurethane liquid are attracted to and deposited upon the fibrous web 12 as a relatively thin layer.

The polyurethane may include a suitable additive which controls foaming of the urethane until after it has been electrostatically charged, atomized and deposited upon the substrate. It is desirable that foaming of the polyurethane take place just after deposition upon the web 12.

The following example is illustrative of electrostatically depositing particles of a foamable polyurethane onto a woven carpet.

EXAMPLE

A carpet 12 of woven fabric about 6 feet wide is effectively grounded in the atomizing zone by a grounded or earthed conductive support plate 29 underlying the carpet and over which the carpet is processed while in the atomizing zone 21. The surface of the carpet to be coated with particles 11 of a foamable, flexible polyurethane while in the atomizing zone is spaced about 10 inches from the extended edge 25 at high electrical potential. The extended edge 25, connected to high voltage direct current power source 27, possesses a length approximately equal to the width of the carpeting 12. A high intensity electrostatic field having a voltage gradient of about 8,000 volts per inch is created between the extended edge 25 and the grounded or earthed conductive support plate 29. Since the carpet 12 is processed over the underlying but earthed support plate 29, the high intensity field tends to pass through the carpeting without significant reduction in its intensity. The several components comprising the polyurethane are admixed in mixing head 32 and are fed to surface 28 of endless belt 13 at a rate of in the range of about 12 to about 25 cc per inch of width of the extended edge 25. The endless belt is moving at a rate proportional to the rate of movement of the carpet 12 and has a width approximately equal to the width of the extended edge 25. It is important that belt 13 be displaced at a speed at which foaming of the polyurethane does not take place in the nip between belt 13 and blade 20 yet that the desired foam depth be realized on the carpet. Charged polyurethane particles are dispensed from the surface 28 of the endless belt 13 toward the carpeting. Moving the carpeting at a rate of about 26 feet per minute past the extended edge results in a substantially uniform deposit of an adherent, expanded foam of polyurethane on the carpeting having a substantially uniform thickness of about one-sixteenth to about one-eighth of an inch depending on the feed rate of the components to the belt 13 and the rate of movement of the carpeting.

After applying a substantially uniform deposit of polyurethane to carpeting, the polyurethane is foamed and may be cured and aged by the application of a suitable elevated temperature for the required period of time.

Polyurethane foams are the foam form of polyurethane resins. Polyurethane foam may be either rigid or flexible, hard and abrasive, or soft and resilient, depending upon components, fillers and method of foaming. In providing a polyurethane foam a polyester such as polyproylene glycol may be treated with a diisocyanate in the presence of some water and a catalyst (amines, tin soaps, organic tin compounds) as well as fillers, dispersing and emulsifying agents, and other substances depending on the end product required. Simultaneously with the polymer-forming reactions, the water reacts with the isocyanate groups to cause cross linking and curing, and also produces carbon dioxide which causes foaming. In other methods, trifluoromethane or similar volatile material is incorporated to serve as blowing agent, and to reduce the thermal conductivity of the finished foam.

Usually, flexible polyurethane foams are based on polyoxypropylenediols of 2,000 molecular weight and polyoxypropylene triols with molecular weight up to 4,000. The triols generally use glycerin as a starter material.

Rigid foams are based on polyethers made from compounds pounds such as sorbitol, methyl glucoside, sucrose, and certain aromatic derivatives.

It is to be understood that the changes and modifications in the concepts disclosed may be made by those skilled in the art without departing from the spirit and scope of the present invention. Such modifications are considered to be within the purview and scope of the present invention and the appended claims.

I claim:

1. An apparatus for providing charged particles of an organoplastic material adapted to be projected toward a substrate comprising
an electrically insulative means comprising a traveling endless belt on which the organoplastic material is provided, a blade means including a relatively sharp wedge-shaped edge disposed within and transversely to said endless belt and associated therewith so as to configure said belt with an attenuated edge, means including an extended edge at high potential adapted to provide a high intensity electric field between the extended edge and the substrate, the extended edge being relatively sharp and extending transversely across said belt and adjacent to said attenutated edge, said extended edge being located so as to be in contact with the organoplastic material on the insulative means, the extended edge and the high intensity field cooperating to provide charged particles of the organoplastic material and means upstream of the attenuated edge for substantially uniformly distributing the organoplastic material on the belt.

2. The apparatus of claim 1, wherein the means for substantially uniformly distributing the organoplastic material on insulative means includes a reciprocating mixing head and means for leveling the organoplastic material on the insulative means.

3. The apparatus of claim 1, wherein the organoplastic material is a flexible polyurethane foam and the substrate is carpeting.

* * * * *